United States Patent Office 3,185,056
Patented May 25, 1965

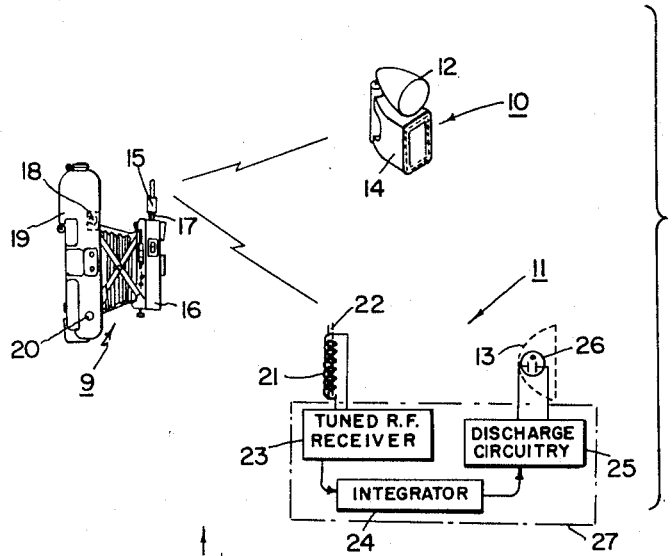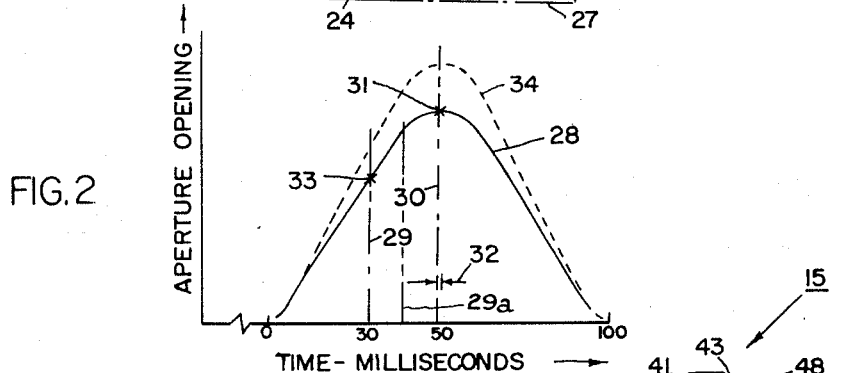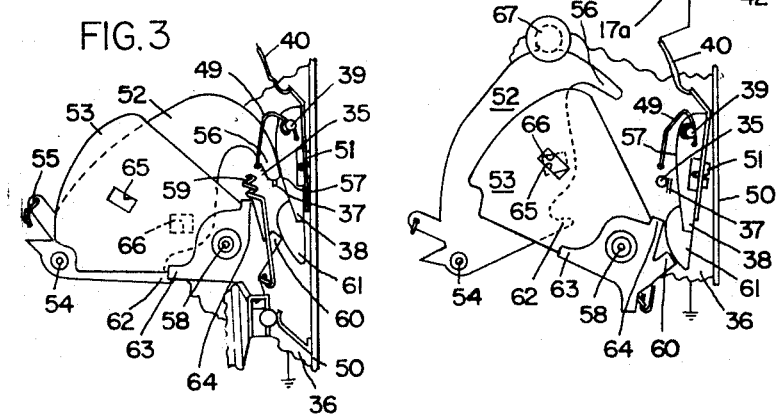

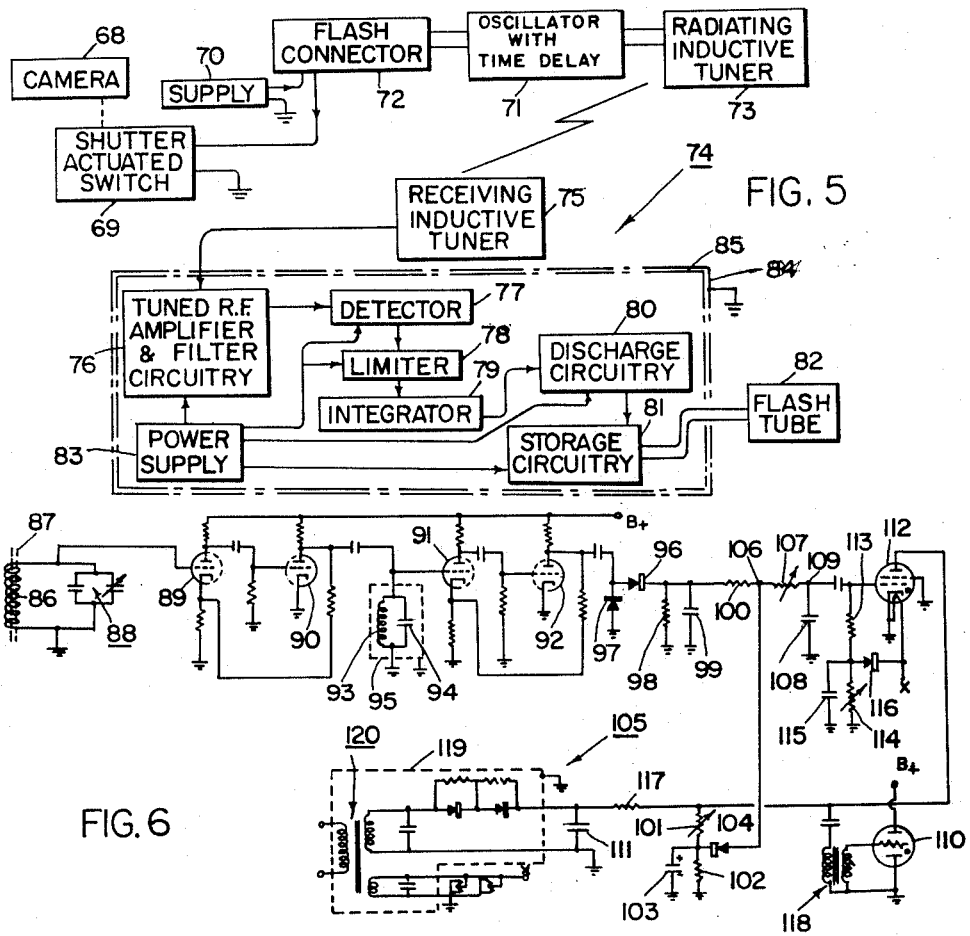
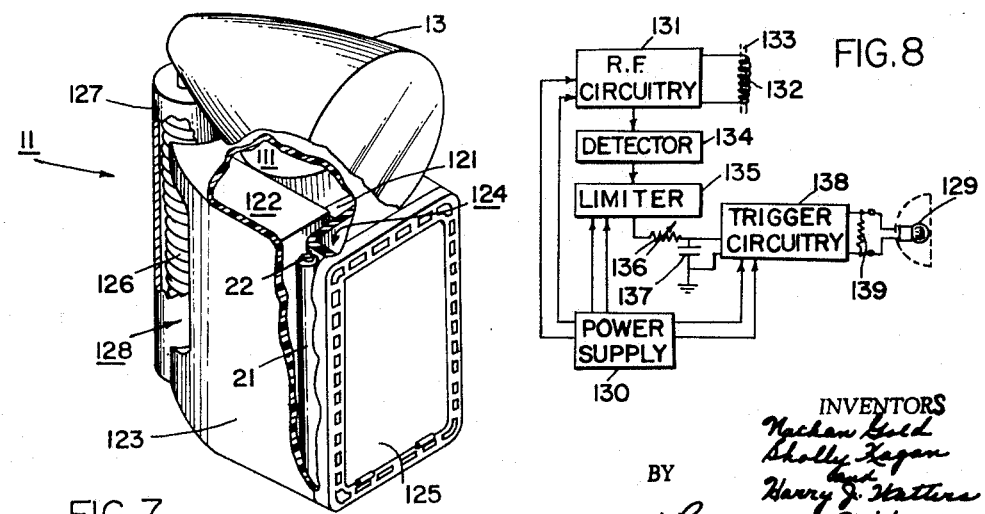

3,185,056
ELECTRONIC FLASH-PHOTOGRAPHY
Nathan Gold, Sharon, Sholly Kagan, Natick, and Harry J. Watters, Weston, Mass., assignors to Polaroid Corporation, Cambridge, Mass., a corporation of Delaware
Filed June 20, 1962, Ser. No. 203,988
21 Claims. (Cl. 95—11.5)

The present invention relates to improvements in flash photography and, in one particular aspect, to novel and improved photographic apparatus which involves camera-controlled electronic actuation of remote flash equipment via communications systems which precisely synchronize occurrences of optimum illumination and camera-opening conditions while affording substantial immunity from interference effects.

Auxiliary high-intensity light sources for optimum illumination of photographed subjects have become an invaluable aid to quality photography, as is well known. Commonly, the preferred directionality of lighting in relation to the camera position, or the broad expanse of the scene being viewed, may require that one or more of such sources be disposed remotely from the camera site. Continuous incandescent floodlighting is not generally suited to such purposes, and low-cost flash bulbs, which are highly advantageous when used with standard camera-mounted flash units for general picture-taking, often are found to be less convenient than repeatable high-speed flash tubes or strobe-type sources when remote illumination is required. For versatility, a camera thus should offer compatibility with the characteristics of both proximately-mounted flash bulb units and remotely-located flash-tube equipments, although there is a complication in this due to the fact that there are pronounced inherent differences in the time vs. light intensity characteristics of these different light sources. Moreover, where there are to be remote actuations of flash-tube equipments, it offers particular advantage to have these equipments triggered automatically and synchronously by the camera without involving troublesome direct electrical or mechanical interconnections. To avoid the latter difficulty, it has been proposed earlier that remote flash-tube equipment may be controlled by way of cable connections with a shutter-actuated switch on a camera, and it has been suggested that a similarly-controlled radio transmitter might communicate with such remote equipment having a radio receiver for like purposes. In addition, it has been recognized that the exceedingly short duration of flash-tube light bursts warrants a delay in firing which would tend to cause the flash illumination to take place at about the time of full opening of the camera shutter.

Efforts to establish a satisfactory and commercially practical wireless control link with remote flash equipments have been severely handicapped by the facts that ambient electrical interference signals tend to produce false triggering which can disturb the intended flashing, that the transmitting and receiving antennas required for efficient communications even over relatively short distances and at high frequencies are undesirably bulky and cumbersome, that the need for high transmitter power outputs to promote positive control and high signal-to-noise ratios dictates resort to a relatively large power supply at the camera site, and that delays needed to synchronize flashing lead toward complex special switching at the camera and tend to slave the flashing to interference signals. In accordance with the present teachings, however, such difficulties may be readily overcome through advantageous induction-field communications at markedly low frequencies, with critically-synchronized signal bursts being emitted from a highly miniaturized camera-actuated transmitter, and with time and amplitude discriminations and a related precise delay being performed at a remote receiver to assure triggering of the desired flash only in response to the intended signals and at the intended critical moments.

It is one of the objects of this invention, therefore, to provide improvements in flash photography involving one or more remote light sources synchronously controlled automatically and with high precision via a wireless communications network which exhibits high immunity to interference.

A further object is to provide novel and improved apparatus of miniaturized proportions and uncomplicated low-cost construction which establishes reliable synchronized control of remote flashing in accordance with camera shutter actuations by discriminating sustained control signals from transient ambient noise and by delaying flashing until the discriminated control signals have persisted for a predetermined interval.

Another object is to provide low-power electronic remote control for flash photography which provides synchronizing delays while remaining substantially immune to interference and involves communications primarily by way of briefly-sustained induction-field emissions at low frequencies.

A yet further object is to provide novel and improved electronic remote control for flash photography wherein sustained electrical switching within a camera which is suitable for the energizing of camera-mounted flash bulbs is exploited for the generation and radiation of signal bursts which, at a remote receiving site, are converted to a predetermined pulse form and then integrated before triggering the firing of a high-speed flash tube, whereby a desired synchronizing delay and a time and amplitude discrimination against noise transients are achieved simultaneously.

By way of a summary account of practice of this invention in one of its aspects, a known form of flash camera is provided with electrical contacts designed to close and dwell momentarily, for a predetermined period, such as a period somewhat in excess of a twenty-millisecond interval which is required for one form of flash bulb to achieve maximum intensity of light output, whenever the shutter mechanism is actuated. This contact closure effects direct connection of a small camera-mounted battery, such as a low voltage dry cell, either to energize a miniature socket-mounted flash bulb backed by a reflector or, alternatively, to energize an interchangeable socket-mounted transistorized transmitter of similarly-miniaturized proportions. When the transmitter is so energized it commences oscillation, after a brief time delay, at a low frequency which is preferably below about 80,000 cycles per second, and emits radiations directly from an unshielded ferrite-cored inductance which is an element of its tank circuit there being no accessory antenna of the customary type. The emission is thus caused to be principally of the induction-field type, with the magnetic induction field diminishing rapidly with distance from the emitting inductance element. Relatively efficient propagation results even though the inductance element is small, whereas conventional communications by way of electric field radiations would be grossly inefficient unless relatively large transmitting and receiving antennas were used, the proportions of which would make mounting of the transmitting antenna on the camera utterly impracticable in the case of low-frequency communications. A burst of low-frequency induction-field signals is thus emitted locally about the camera for a period of at least about eleven milliseconds each time the shutter is actuated, and such signals are intercepted by a small unshielded ferrite-cored inductance which is an element of a tuned low-frequency input stage of a remotely-situated auxiliary flash unit disposed to illuminate a subject which is to be photographed. In the remote flash unit, the amplified input is filtered, to suppress certain interference signals, and is then detected and precisely limited to form a pulse of predetermined proportions, after which it is integrated. To the integrating circuitry is ascribed a time constant sufficiently long to insure that only signal bursts sustained at least about eleven milliseconds will charge its capacitance element to a predetermined level at which it exceeds a fixed unidirectional bias on the control grid of a thyratron connected across a D.C. supply, whereby the thyratron will fire instantly when the prescribed total synchronizing interval of about twenty milliseconds elapses. Firing of the thyratron is attended by instantaneous discharge of a previously-charged capacitor through a strobe-type flash tube which thereupon illuminates the photographed subject at maximum intensity in accurate synchronism with the condition of maximum shutter opening within the camera.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

FIGURE 1 represents a flash photography system embracing certain of the present teachings, in pictorial and block-diagrammed conventions;

FIG. 2 provides characteristic curves representing typical camera aperture openings versus time of shutter movement, and upon which are designated important related times and intervals for purposes of the present invention;

FIG. 3 illustrates a camera shutter and electrical contact mechanism in a condition which exists prior to contact closure;

FIG. 4 illustrates the camera shutter and electrical contact mechanism of FIG. 3 in the actuated condition wherein the aperture has about a maximum opening and the electrical contacts remain closed;

FIGURE 5 is a block diagram of camera-actuated transmitter and cooperating remote receiver-actuated flash apparatus in which this invention is practiced;

FIG. 6 comprises a schematic diagram of a preferred embodiment of remote receiver-actuated flash equipment;

FIG. 7 represents pictorially the remote flash equipment of FIG. 6, with portions cut away to expose constructural details; and FIG. 8 is a partly schematic and partly block-diagrammed illustration of an alternate embodiment of remote flash equipment.

The arrangement portrayed in FIGURE 1 includes a photographic camera 9 which is of a small folding construction lending itself to hand support by the operator as it is being used to photograph a subject. Auxiliary lighting of the subject is commonly provided for such purposes as suppression of shadows, special effects, illumination of distant or broad-area subjects, or the like, and a pair of remote auxiliary lighting units, 10 and 11, are shown in cooperation with the camera 9 to serve these needs. Each of the remote units is of portable dimensions and bulk and includes a flash source at about the principal focus of the respective concave reflector assemblies, 12 and 13, whereby the units may readily be located and aimed as required. The power supplies for the flash sources, together with certain actuation and control circuitry constructed in accordance with the present teachings, are conveniently housed within portable carrying cases, such as the case 14, which for purposes of this invention are fashioned at least in part of material, preferably a common molded plastic, which is both magnetically and electrically nonconductive. An objective of this general arrangement, not novel here per se, is to trigger remote flash sources such that they will illuminate the photographed subject as the camera is actuated, although prior practices have involved different remote control which has introduced wired interconnections between the camera and remote flashers or, absenting wiring, has employed radio communications involving cumbersome antennas and possessing inherently high susceptibility to interference from ambient noise of radio frequencies. In those instances where conventional radio communications are developed, signals of relatively high power must be generated and radiated to insure that high signal-to-noise levels will obtain at the remote receivers, even though the transmission distances may be relatively short, and the associated power pack for the camera-actuated transmitter must be appropriately large. Further, for such communications the antenna sizes must be large as well, to establish efficient radiation and absorption which will yield maximum signal strength at the receivers. The latter consideration suggests that such communications should be at very high frequencies wherein both the transmitting and receiving antennas might be relatively small while approaching dimensions comparable to the wave lengths involved, but it is also unfortunately true that troublesome ambient noises of high level tend to be more prevalent at the higher frequencies and are more apt to trigger the flashers falsely and thereby impair the intended operation. Reliability is of course a fundamentally important factor in photographic equipment, and propensities toward false operation constitute a major obstacle to the exploitation of remote flash apparatus.

While the communications link between camera 9 and each of the remote flash units in FIGURE 1 is of a wireless type, needed operating reliability and isolation from interference are nevertheless provided, only relatively simple equipment and circuitry are involved, low transmitter power suffices to establish positive communications, and radiation and absorption of propagated waves is achieved efficiently without use of lengthy or bulky antennas. In this connection, the small hand-held camera is shown to support a highly-miniaturize transistorized transmitter 15 which is mounted atop the camera front 16 on a plug-in electrical socket 17 which at other times may alternately be used to mount a flash bulb and reflector combination of comparably small proportions. A miniature cylindrical battery or cell 18 releasably clip-mounted in an accommodating recess in the camera back 19 serves as the power supply for either the transmitter or the interchangeable flash bulb and reflector combination, the battery being connected thereto at times through an electrical switch which is designed to make a brief but sustained connection whenever the camera shutter is released following manipulation of the shutter release button 20. In one simple form, the transmitter circuit may involve but a few miniature components, including two unshielded windings associated with a vertically-oriented ferrite core, the core and windings serving as both the tuning and radiating assembly for the transmitter. Such transmitter circuitry is essentially that an inductively-loaded oscillator, alone, without a separate transmitting antenna, although at a low-frequency tuning, such as a tuning of but about 40 kilocycles, the unshielded tuning assembly itself is effective to emit important continuous-wave induction-field signals which can readily be detected by suitable receivers within the remote flasher units 10 and 11 over an appreciable distance satisfactory for flash-photography purposes. A transmitter power drain of about 450 milliwatts is typical of one suitable construction, and the 40 kc. C.W. emissions may be initiated either instantaneously as the transmitter is energized by the cell switching or following a brief delay (up to about nine milliseconds) after the switching occurs. Dwell of the shutter-actuated electrical switch contacts is pre-set for a predetermined period which assures that the transmitter will emit a burst of the induction-field signals persisting for at least about eleven milliseconds each time the shutter is operated. Emissions terminate when the switch contacts open following the dwell of closure. As is described in more detail later herein, the contact closures and, hence, bursts of signals, are in predetermined synchronized relationship with the camera shutter openings.

For purposes of this invention, the induction-field signals developed by the camera-mounted transmitter are preferably within the optimum 20–80 kc. very low-frequency range, the aforementioned 40 kc. value or thereabouts being particularly advantageous. At these low frequencies, ambient noise signals of troublesome field strength are less likely to be encountered than at higher frequencies, and, moreover, the transmitter output control signal bursts themselves are highly unlikely to cause interference in other equipments because of the relatively low-radiated power and limited-purpose uses otherwise made of such frequency bands. Further, the transmissions by way of induction-field, rather than electric-field, signals occasion the distinct advantages that the field patterns for such signals possess sharp cut-off, thereby limiting the interference both with and from other equipments, and that such signals do not tend to reflect appreciably. It will of course be appreciated that the lengths of antennas which would be required for efficient transmission and reception of radiation-field signals in the band of interest (below about 80 kc.) would be so great as to make their use for present purposes a practical impossibility, and this emphasizes that the omission of a transmitting antenna at these frequencies effects a desired thorough suppression of unwanted electric-field radiations and a desired concentration of signal strength and transmitted power in the induction-field signals, whereas at higher frequencies the corresponding results are not as favorable and strong induction fields could be produced only at the expense of high power drain. The omission of an antenna such as is needed for propagation of electric-field signals represents a major advantage in terms of miniaturization of the transmitter, and there is corresponding reduction in the bulk and convenience in use of the remotely-controlled flasher units as well. In those constructions wherein the control information is contained in C.W. signals bursts, rather than in distinctive modulation of the carrier, the signal need be of but one frequency, which may be generated very simply and may be a very low frequency. In addition, the efficient generation and propagation of induction-field signals at the low frequencies involved requires only extremely low power; in some constructions this power may be conveniently tapped from a miniature dry cell of a common inexpensive type used to energize a flash bulb, such that no separate auxiliary power pack or cord connection is required for the transmitter and it may be mounted in its entirety upon the hand-held camera.

In each of the remote flasher units 10 and 11, the transmitted low-frequency induction-field signals of at least about eleven milliseconds duration are selectively amplified and are caused to trigger a flash source. The details of unit 11 are typical, and this is shown to include a tuned input winding 21 associated with a vertically-oriented elongated core 22, which may be a ferrite or another material with high permeability, both of which are electrically and magnetically unshielded such that the transmitted induction-field signals will induce corresponding low-frequency sustained bursts of electrical signals in the input winding. Simple tuned-amplifier circuitry 23 amplifies and detects each induced C.W. burst, developing a corresponding unidirectional pulse of predetermined height and of the same duration (i.e., at least about eleven milliseconds), and then applies this to an integrator 24. At the end of about eleven milliseconds, and provided the applied pulse is of at least that duration and at least the predetermnied height, integrator 24 immediately triggers discharge circuitry 25 to discharge substantially instantaneously through the gas-filled strobe-type flash tube 26, thereby illuminating the photographed subject at the moment when the shutter of camera 9 has about a maximum opening. Shielding 27 suppresses both electrostatic and magnetic interferences, to insure that the triggering is solely by way of those signals which have been induced in the input winding, filtered through the tuned-amplifier circuitry, and selectively passed or rejected for triggering purposes by the integrator. Ambient noise signals of comparable frequencies which might be expected to precipitate false triggering tend to be transient and of duration generally of the order of but a few microseconds, which is very short in relation to the bursts (eleven to twenty milliseconds) conveying the remote control information. As a consequence of this, such transient noise pulses as may be passed to the integrator do not effect triggering of the flash tube, and the system is thus caused to be isolated from them.

Practice of this invention is not restricted to use of strobe-type flash tubes, rather than filamentary-type flash bulbs, in the remote flash units, and as is discussed later herein, important advantages can accrue from the triggering of certain types of remote flash bulbs by way of the essentially interference-proof control system. However, the virtually instantaneous firing characteristics, as well as repeatability, of gas-filled flash tubes makes their use particularly attractive for present purposes. This is readily perceived with reference to the curves in FIG. 2 wherein the abscissa is scaled in terms of time, in milliseconds, and the ordinate in terms of camera aperture opening for a camera such as that operating in the system of FIGURE 1. Curve 28 characterizes the camera opening conditions which are to take place as the shutter mechanism is actuated for picture-taking with the aid of a conventional flash bulb mounted on the front of the camera in lieu of the transmitter. The flash bulb characteristic is assumed to be one in which maximum intensity of light output occurs about 20 milliseconds after the bulb is first energized by the battery, while the actual opening of the camera occurs over a longer interval of about 100 milliseconds. Accordingly, the bulb should first be energized at a time about 30 milliseconds following the initial opening of the camera to the scene being photographed, this time being marked by the dashed line 29. When the induction-field transmitter 15 is employed to control remote flashing, it likewise must be energized to commence emission of its low-frequency (for example, 40 kc.) burst of signals either at about the same time, 29, relative to the initial opening of the camera, or at some later time up to the briefly later time, 29a, and the emission must thereafter be continued (for at least eleven milliseconds) until the time marked by dashed line 30, when the curve 28 is at about its maximum point 31 and the camera opening is a maximum. In the manner already described, each remote flash unit has then reached a fully triggered state following its response to an eleven to twenty millisecond duration of the sustained burst of signals, and its gas-filled flash tube discharges substantially instantaneously, the discharge and light-flashing interval being characterized by the interval 32 in FIG. 2. Accordingly, the flash illumination of the subject occurs at the optimum moment, when the camera opening is at about a maximum. Were the triggering instantaneous, immediately upon reception of the 40 kc. signals, the flash tube would briefly illuminate the subject at a nonsynchronous time corresponding to point 33 on curve 28, well before the maximum camera opening occurred, with the result that the exposure would be defective, and even short ambient noise pulses would then be apt to cause false firing at various improper times. Dashed-line curve 34 suggests the differing camera-opening characteristics which may obtain and with which the same, beneficial results are realized through practice of this invention.

Transmission of a sustained burst of continuous-wave low-frequency induction-field signals is thus seen to be an important aspect of the positive interference-free control of the remote flash units. The burst of transmitted oscillations may be sustained for the critical period (for example, the 20 millisecond period between times 29 and 30) simply by holding the electrical connection of the battery to the transistorized transmitter for some convenient time which need not be regulated but merely should not be shorter than the critical (ex. 20-millisecond) period. This is readily accomplished by providing for a dwell of the shutter-actuated electrical switching contacts in the camera for at least this period. Details of a suitable shutter and contact mechanism in the front 16 of the camera 9 in FIGURE 1 are depicted in FIGS. 3 and 4, wherein the two cooperating electrical contacts comprise a stationary conductive contact member 35 grounded with the mounting plate 36 which is part of the front of the camera, and a movable conductive contact member 37 fixed with the electrically-insulating arm 38 which turns about a pivot 39 on the mounting plate 36. As appears in FIG. 3, the two contacts are in a separated relationship, and no electrical connection is being made through them, while in FIG. 4 the contact 37 has been carried clockwise by insulating arm 38, about the pivot 39, and into electrically-connecting engagement with the stationary contact member 35. The latter action effects a grounding of the cable 40 connected to contact 37 and thereby places battery 18 into energizing relationship with the induction-field transmitter 15, through the camera socket connections 17a (FIG. 4). A preferred transmitter construction shown schematically in FIG. 4 includes the pair of transistors 41 and 42, such as NPN or PNP switching-type transistors, for example type 2N1637 transistors, which are in a known type of push-pull inductively-loaded oscillator circuit including resistors 43 and 44 and the halves of a primary winding 45 of a tuning assembly. The tuning assembly also includes a secondary winding 46 tuned to the desired frequency within the 20-80 kc. range by a condenser 47 and both the secondary and primary windings are associated with a high-permeability core 48, such as a ferrite core, to promote direct emission of strong induction-field signals without use of an antenna which would be required for radiation of high-power electric-field radiations. Other suitable oscillator circuits will suggest themselves to those skilled in the art. In the example under discussion, no material delay is encountered in the start of oscillations once the contacts 35 and 37 are engaged, although a delay may be incorporated to advantage in some transmitters, as is discussed later herein. Movable contact arm 38 is normally biased counterclockwise to carry contact 37 out of engagement with contact 35, by the bias spring 49, the mounting plate flange 50 serving as a backstop for an adjustable stop screw 51 on arm 38. In FIG. 3, the two-apertured camera shutter plates 52 and 53 are shown in temporary repose as the camera shutter is cocked but not yet released in response to actuation of the camera shutter release button 20, and it is seen that the back plate 52 has been rotated clockwise about its pivot 54 against restraint of its bias spring 55 to force its cam finger 56 against the cam follower edge 57 of contact arm 38 and thereby hold the contact 37 out of engagement with the stationary grounding contact 35. At the same time, the front shutter plate 53, biased counterclockwise to the illustrated position about its pivot 58 by the spring 59, continues to force its cam 60 against the contact arm cam follower 61 and thereby continues to hold the contacts open also. As the rear shutter plate 52 is suddenly released by actuation of the camera shutter button 20, it commences a swift counterclockwise rotation about pivot 54 powered by spring 55, and its cam finger 62 lifts follower 63 of the front shutter plate 53 to throw plate 53 clockwise about its pivot 58 until the cam finger and follower separate. Near the clockwise limit of its travel, front shutter plate 53 thrusts its cam 64 against the follower 61 of the contact arm 38 such that the contacts 37 are kept from engaging contact 35 after the cam finger 56 of back plate 52 is no longer located to serve this purpose. Thereafter, as the front shutter plate 53 commences its swift counterclockwise return powered by its bias spring 59, the cam 64 first withdraws from follower 61 to permit contact arm 38 to be pivoted clockwise by its spring 49 and, thereby, to connect contact 37 with contact 35. Proportioning and positioning of the parts insures that the electrical connection first occurs at a desired time (such as 20 milliseconds in one case, or 12 milliseconds in another typical case) in advance of occurrence of the maximum shutter opening, and the transmitter 15 is then instantaneously energized to oscillate and emit C.-W. induction-field signals at a low frequency such as 40 kc. The contact closure, and hence the transmitter oscillations, persist for at least a corresponding period (i.e., at least 20 milliseconds) while front shutter progressively moves further counterclockwise to the position illustrated in FIG. 4 wherein the aperture 65 in the front shutter plate 53 is at about maximum-area registration with the aperture 66 in the back shutter plate 52. Back shutter plate 52 is at that time held stationary against a stop 67, and the camera exposure occurs through the aligned shutter apertures 65 and 66 as well as through other components of the camera which need not be recited here. Next, the cam 60 on front shutter plate 53 engages cam follower 61 of contact arm 38 and thrusts it counterclockwise about pivot 39 to separate movable contact 37 from contact 35 and, thereby, to de-energize the transmitter 15 and thereby end the burst of induction-field signals. While the contacting period is to persist for at least the predetermined 20-millisecond or other appropriate interval leading to maximum opening of the shutter, as regulated by the cam and follower orientations, the time of contact opening is not otherwise critical and the contacts may be separated at any convenient later time and then remain open as the front shutter plate continues to turn counterclockwise to its stopped position. Subsequently, cocking of the back shutter plate 52 will again ready the mechanisms for another opening of the shutter and synchronously-timed electrical contacting cycle.

The camera equipment block-diagrammed in FIG. 5 includes a camera mechanism 68 controlling a shutter-actuated electrical switch 69 having the desired synchronism and minimum dwell characteristics for connection of an electrical supply 70 to an oscillator and time delay unit 71 through a suitable connector 72 adapted to receive and energize either a flash bulb or the transmitter. Radiating-inductive tuner 73, which preferably serves to tune the oscillator, emits the desired bursts of low-frequency induction-field signals for control of associated remote flash units such as the unit 74. It will be understood by those skilled in the electronics arts that the oscillator circuitry of unit 71 may assume forms other than that detailed schematically in FIG. 4, that the supply may be a separate supply for the oscillator, which need not also be used alternatively for excitation of flash bulbs, and that the electrical switching may be of connections within the oscillator and tuner circuitry rather than in the supply circuitry, all with useful results. In particular, it is advantageous that unit 71 incorporate a time delay, preferably selectably variable up to about nine or ten milliseconds, which will impose a delay before the oscillator can deliver an output after the switch 69 first closes. Well-known time-delay circuitry may be exploited for this purpose, the result being that one type of remote flash unit, having a fixed time-discrimination characteristic (ex. 10–11 milliseconds) set at the factory, may be fired by cameras having different switch-closure dwell times before the maximum shutter opening condition is realized. For example, a camera having a switch closure which persists only for 11 milliseconds before maximum shutter opening occurs would then call for zero time delay in its associated transmitter. On the other hand, a camera having a switch closure persisting for 20 milliseconds before maximum occurs would call for a 9–10 millisecond delay in its associated transmitter, which delay may be set by the manufacturer such that the transmitter and camera are matched in this respect. Any matched camera and transmitter combination may thus be used to fire all flash units set for the minimum (10–11 milliseconds) necessary time discrimination. Alternatively, as in the example considered later herein, the time-discrimination characteristics of the remote flash units may instead be varied.

The remote flash unit 74 likewise includes an inductive-tuning assembly, 75, which is unshielded and thus responds to the induction-field radiation at the low frequency of the oscillator. Electrical output signals of this frequency from the tuner 75 are amplified and filtered in circuitry 76 which includes one or more stages of simple-tuned amplification of the C.W. signal bursts and which also preferably includes a filter network passing only the low frequency of interest while rejecting or greatly attenuating others. The amplified and filtered signal bursts are then converted into unidirectional pulses of the same duration (such as a duration exceeding 20 milliseconds, for example) as the signal bursts, by a detector stage 77. In turn, the detector pulse output is limited at a highly exact level, by limiter 78, for the purpose of assuring a constancy of voltage needed for a critical integration operation in an integrator 79. Discharge circuitry 80 responds to the occurrence of a predetermined amplitude of output of integrator 79 by instantly triggering a storage circuit 81 into discharge of its stored energy through a flash tube 82, thereby causing the photographed subject to be illuminated momentarily. Flash illumination can occur only when a pulse applied to the integrator is of the full predetermined amplitude set by the limiter and persists for the prescribed minimum duration (such as 20 milliseconds). Ambient interference signals, which fail to possess the prescribed frequency, prescribed minimum amplitude, and prescribed minimum duration, therefore cannot cause false triggering. Power supply 83 energizes the various stages of the flash unit circuitry, as needed, while electrostatic and magnetic shields 84 and 85 act to further prevent both ambient and self-generated interference signals from precipitating false operations.

Schematic circuitry of the flash unit depicted in FIG. 6 is of the same general character as that block-diagrammed in FIG. 5. The inductive tuner there comprises a winding 86 about an elongated ferrite core 87 and paralleled with a tuning capacitor combination 88 of a fixed and variable condenser, the latter for the purpose of matching the tuning with the particular frequency of the associated camera-mounted transmitter, within the useful band (up to about 80 kc.). Triode tube section 89 forms a tuned input stage with this tuner, and the resistance-coupled amplifier including the second tube section 90 provides further amplification, with simple feedback. Because of relatively low levels of the induced signals at locations more remote from the transmitter, it is desirable to provide the two further stages of amplification afforded by the resistance-coupled circuitry, including feedback, of dual triode tube sections 91 and 92. These stages are untuned, thereby reducing their susceptibility to pick-up of interference signals and reducing the complexities and costs of construction and tuning. However, a parallel combination of inductance 93 and capacitance 94 in the input circuit-feeding amplifier tube 91 is tuned to about the low-operating frequency and acts as a selective filter which bypasses to ground any unwanted stray signals which are of higher or lower frequency than the operating frequency. Grounded shielding 95 about this parallel-tuned circuit isolates it from ambient interference signals which might otherwise induce unwanted signals in the filter itself. Following the amplifications of the received signal bursts, detection is performed by the diodes 96 and 97, the former passing half-cycles of the C.W. signals under consideration to the load and filter network comprising resistance 98 and capacitance 99, while the latter drains the opposite half-cycles to ground. Output of the detector circuitry is therefore in unidirectional pulse form, wherein the pulse width of the converted signals is substantially the same as the duration of the detected signal bursts, namely, at least 20 milliseconds in the example under consideration.

Importantly, the pulse output is next precisely limited, to insure that the pulses are of one predetermined height, as well as the predetermined width. Precision limiting is achieved by the circuitry including resistances 100, 101, and 102, capacitor 103, and diode 104. Resistances 101 and 102 are connected across the output of the D.C. power supply 105, which tends to yield a predetermined output voltage, and these resistances comprise a voltage divider which sets the voltage level of the intended limiting action. As the pulse voltage appearing at the junction 106 of resistance 100 and diode 104 seeks to rise above this level, diode 104 conducts to permit the excess voltage to drop across resistance 100 and thereby assures that the pulse voltage at junction 106 is maintained at the same level as the voltage at the voltage-divider junction between resistances 101 and 102. Capacitor 103 absorbs pulses of current conducted by diode 104, thereby preventing the voltage at the junction of voltage-divider resistances 101 and 102 from varying with the conduction of the diode and thereby assuring a precise limiting which is important to properly-synchronized operation of the equipment.

The desired selectivity based upon pulse durations of at least a predetermined minimum width (as well as the predetermined height) is aided by an integrating circuit including the resistance 107 and capacitor 108. The time constant of this resistance in series and capacitor in parallel, between each of the junctions 106 and 108 and ground, is selected such that the voltage appearing at the output junction 109 reaches a predetermined level above ground only after each of the pulses of uniform predetermined amplitude applied at junction 106 has been sustained for at least a predetermined synchronizing and discrimination interval, such as about the 20 milliseconds for the example under discussion. Although in other instances the corresponding interval may be shorter than this, it is desirable to have a time constant of at least about 10 milliseconds, such that the noise and other interference signals which are generally much shorter will effectively by passed to ground through capacitor 108 and will be unable to cause triggering of the gas-filled flash tube 110. The latter tube, through which voltage is discharged from a parallel storage capacitor 111 to cause its firing and consequent synchronized illumination of the photographed subject, is triggered into firing by the firing of a thyratron 112. Thyratron 112 fires instantly as the voltage applied to its control grid from the integrator junction 109 reaches a predetermined level overcoming the opposite precise biasing by the network including resistances 113 and 114, capacitor 115, and diode 116. For the purpose of insuring instantaneous firing, the thyratron plate circuit is supplied with direct current from the power supply 105, rather than with A.C., as is commonly the case but here could admit of delays significant enough to disturb firing in synchronism with maximum opening of the camera. The last-mentioned network develops a desired value of unidirectional control grid bias and thereby also sets the predetermined level to which the voltage from the integrator must rise before the thyratron firing can take place. Preferably, the control of firing time, following emission and detection of a control signal burst from the camera-actuated transmitter, is set by adjustment of the value of resistance 107, which is made as a variable resistance for this purpose. However, the control of timing is also affected by the level at which limiting is set (i.e., by the voltage applied to the integrator) and by the level of biasing applied to the thyratron control grid to suppress firing except as intended. Accordingly, variable resistances in these two circuits, such as variable resistances 101 and 114, will likewise permit timing control. Although in FIG. 2 the flash tube firing was represented at about the precise instant at which maximum camera opening occurred, it should be apparent that this is not finely critical and that there is in fact a span of time within which the camera opening is essentially a maximum and that this therefore provides some leeway in the adjustment of firing time. Accordingly, the timing control can be set with the objective of rejecting interference effects, within a certain range which will nevertheless cause the firing to occur at about the optimum time.

Firing of thyratron 112 develops an abrupt change in voltage at its plate, because of the attendant drop across its load resistance 117, whereupon a substantially simultaneous pulse of firing voltage is induced in the secondary of the transformer 118 and triggers the control grid of the gas-discharge flash tube 110 to permit the storage condenser 111 to discharge through that tube and thereby develop the needed synchronized flash. Importantly, these triggering actions occur without material time delay. D.C. power supply 105, which is of a conventional A.-C. powered type, is preferably shielded both magnetically and electrostatically, as indicated by the dashed linework 119, to minimize likelihood of interference and false firing by self-generated interference and noise signals. Preferably, the power transformer 120 is separately provided with electrostatic shielding of high effectiveness and is encased by a steel transformer can, for the same purposes, and to afford the desired magnetic shielding. The flash unit assembly 11 pictured in FIG. 7 is of a construction like that of FIG. 6 and is shown to include a heavily-shielded container 121 for the power supply, a shielded container 122 for the flash-controlling circuitry including the thyratron, and the storage capacitor 111, all within a sturdy plastic housing 123. The inductive-tuner assembly including ferrite core 22 and winding 21 (corresponding to core and winding 87 and 86, respectively in FIG. 6) is also disposed within the plastic housing 123, although near the front thereof where it is in such spaced relationship to the aforesaid shielding containers that it remains unshielded electrostatically and magnetically and can be highly responsive to the induction-field signal bursts released by the associated camera-mounted transmitter. The adjacent space 124 occasioned at the front, which is preferably unoccupied by any conductive or magnetic hardware during use of the flash unit in picture-taking, is conveniently employed as a storage space for the matching transmitter when it is not being operated. Front cover 125 may be opened to afford access to this space. Assembly 13 atop the housing includes a suitable reflector and window for the flash tube within it, and is preferably detachable for positioning remotely from the housing as lighting needs dictate while remaining interconnected via the pre-coiled cable 126 normally stored in the hollow-carrying handle 127 which is separated by a hand space 128 from the rear of the housing over a portion of its height.

As is represented in FIG. 8, practice of certain of these teachings also embraces the remote control of filamentary flash bulbs, such as the common form of bulb 129, which characteristically involves a distinct delay between the moment when electrical excitation is applied and the moment when the light emission is of maximum intensity. By way of one example, a characteristic delay of this type of about 12 milliseconds is offered by certain flash bulbs, and the further delay occasioned by a selective discrimination and synchronized delay period of about 10 milliseconds yields a total lapse of but about 22 milliseconds from the time of closure of a shutter-actuated electrical switch and the time at which the photographed subject can be illuminated at maximum brilliance by a remotely-triggered flash bulb. This total lapse brings the optimum illumination substantially into coincidence with the maximum camera-opening condition, as is desired, while yet involving a delay needed to isolate the system from interference effects in the manner already described herein. The use of flash bulbs, rather than flash tubes, can be highly advantageous inasmuch as the power supply 130 may then be of particularly small bulk and weight, and may comprise a miniature battery which enables the flash unit to be used without regard for the locations of electrical utility outlets. In such instances, the control circuitry also preferably exploits known equivalent solid-state devices and circuitry rather than heated cathode tubes, to minimize the power requirements as well as to facilitate even further miniaturization. Input circuitry 131, which preferably involves simple transistorized R.F. amplification, first responds to signals induced in the tuned winding 132 about the high-permeability core 133. Detector 134 converts the amplified low-frequency bursts into unidirectional pulses of at least a predetermined width, as established by the proportions and spacings of switch-actuating cams in a remote camera shutter and switch assembly such as the assembly illustrated in FIGS. 3 and 4. Limiter 135 establishes a predetermined height of each pulse as it is passed to the integrator formed by variable time-constant control resistance 136 and capacitor 137. After a predetermined interval during which the pulse input to the intergator persists at the predetermined level, the integrator delivers a voltage of predetermined value to the trigger circuitry 138 which is set to fire when that predetermined value of input voltage is presented to it. The trigger circuitry may be of a form earlier described herein or may instead conveniently comprise another known type of trigger circuit which has two stable conditions of equilibrium, preferably a solid state circuit. Upon triggering to drive a current through the load resistance 139, which is one of the intended equilibrium conditions, the voltage drop across the load resistance is caused to reach a value which will properly excite the flash bulb 129 to emit the needed light at the proper time. High reliability is afforded inasmuch as false triggering is suppressed within the system.

While specific practices have been described, and while particular embodiments have been illustrated and referred to in the descriptions, it should be understood that various changes, modifications and substitutions may be effected without departure from these teachings, and it is aimed in the appended claims to embrace all such variations as fall within the true spirit and scope of this invention.

What is claimed is:

1. Flash-photography apparatus comprising a camera having a shutter mechanism and reaching substantially a maximum exposure setting a predetermined time after initial actuation of the shutter mechanism, a normally-open flash synchronizing switch actuated by said shutter mechanism and closeable a first predetermined interval after each initial actuation of said shutter mechanism, said shutter mechanism closing said switch for at least a second predetermined interval following said first interval, the total of said first and second intervals being at least equal to said predetermined time for said camera to reach substantially said maximum exposure setting, a transmitter for emitting a burst of radio signals responsive to and persisting during each closure of said switch, a flash lamp for briefly illuminating a subject to be photographed, means for intercepting said signals remotely from said transmitter and for producing related output signals of the same duration as said signals, and means responsive to said output signals of duration equal to the time between the beginning of said second interval and said predetermined time for firing said flash lamp immediately thereafter while said shutter mechanism opens said camera substantially to said maximum exposure setting.

2. Flash-photography apparatus comprising a camera having a shutter mechanism and reaching a predetermined exposure setting a predetermined time after initial actuation of the shutter mechanism, an oscillator having inductance means for directly emitting induction-field signals in the frequency range up to about 80 kilocycles responsive to excitation of said oscillator, means for actuating said shutter mechanism and for exciting said oscillator to emit said signals throughout at least a predetermined interval commencing during actuation of said shutter means and continuing at least until said predetermined exposure setting is reached, a flash lamp for briefly illuminating a subject to be photographed, inductance means tuned to the frequency of said signals for directly intercepting said induction-field signals remotely from said oscillator and producing related output signals persisting for said predetermined interval, and means responsive to said output signals which persist throughout said interval until substantially said predetermined time for firing said flash lamp immediately thereafter while said shutter mechanism produces substantially said predetermined exposure setting of said camera.

3. Flash-photography apparatus as set forth in claim 2, wherein said means for actuating said shutter mechanism and for exciting said oscillator includes a normally-open flash synchronizing switch actuated by said shutter mechanism and closeable a first predetermined interval after each initial actuation of said shutter mechanism, said shutter mechanism closing said switch for at least a second predetermined interval following said first interval, the total of said first and second intervals being substantially equal to the time required for said shutter mechanism to produce said predetermined exposure setting of said camera after initial actuation thereof.

4. Flash-photography apparatus as set forth in claim 3, further comprising a battery mounted on said camera, an electrically energizable flash attachment for receiving and energizing flash bulbs therein, and means for selectably mounting said flash attachment and said transmitter on said camera and in electrical circuit connection with said battery through said switch, and wherein said flash lamp comprises a gas-discharge flash tube producing substantially instantaneous illumination upon firing.

5. Flash-photography apparatus as set forth in claim 3, wherein said second predetermined interval is at least about 10 milliseconds.

6. Flash-photography apparatus as set forth in claim 3, wherein said means producing said related output signals includes a detector producing susbtantially unidirectional output pulses responsive to the intercepted bursts of said radio signals, and wherein said means for firing said flash lamp responsive to said output signals includes an integrating circuit producing a predetermined level of voltage for firing said flash lamp only after each of said output pulses has persisted for substantially said second interval.

7. Flash-photography apparatus as set forth in claim 6, wherein said means producing said related output signals further includes means continuously limiting said output pulses to a predetermined amplitude.

8. Flash-photography apparatus comprising a camera having a shutter mechanism and reaching a predetermined exposure setting a predetermined time after initial actuation of the shutter mechanism, transmitter means for emitting a burst of radio signals responsive to each actuation of said shutter mechanism, each said burst being sustained for at least a predetermined interval following each initial actuation of said shutter mechanism and continuing at least until said predetermined time when said predetermined exposure setting is reached, a flash lamp for briefly illuminating a subject to be photographed, inductance means tuned to the frequency of said signals for intercepting said signals remotely from said transmitter means, amplifier means amplifying the signals intercepted by said inductance means, detector means producing substantially unidirectional pulses responsive to the bursts of said signals amplified by said amplifier means, means continuously limiting said unidirectional pulses to produce unidirectional pulses of predetermined amplitude and of duration substantially equal to the duration of the intercepted signals, integrating means producing a predetermined level of output voltage responsive only to said unidirectional pulses of said predetermined amplitude and of duration at least equal to the time between each said initial actuation of said shutter mechanism and substantially said predetermined time thereafter when said predetermined exposure setting is reached, a source of stored unidirectional electrical energy connected across said flash tube for discharge therethrough upon firing of the flash tube, a thyratron tube connected to discharge said source through said flash tube when conducting, means energizing the plate circuit of said thyratron tube with unidirectional voltage, means normally biasing said thyratron tube unidirectionally to a nonconducting state at a predetermined voltage level, and means applying said output voltage from said integrating means to said thyratron to overcome the effects of said biasing means and to render said thyratron tube conducting instantly when said output voltage is at said predetermined level responsive to pulses of said predetermined amplitude which are of duration substantially equal to the time between each initial actuation of said shutter mechanism and said predetermined time thereafter when said predetermined exposure setting is reached.

9. Flash-photography apparatus for use with a camera having a shutter mechanism which produces a predetermined exposure setting a predetermined time after initial actuation thereof and a transmitter actuated by the shutter mechanism to emit a burst of radio signals sustained for at least a predetermined interval commencing during each actuation of said shutter mechanism and continuing at least until said predetermined time, comprising a flash lamp for briefly illuminating a subject to be photographed, means for intercepting the bursts of radio signals propagated through surrounding space and for producing related output signals of the same duration as said bursts, trigger circuit means for firing said flash lamp immediately upon actuation thereof, and integrating means selectively responsive only to said output signals having a predetermined duration of at least the time between the beginning of said interval and said predetermined time for actuating said trigger circuit means to fire said flash lamp and illuminate the subject to be photographed.

10. Flash-photography apparatus as set forth in claim 9 wherein said means for intercepting said signals and producing related output signals comprises tuned amplifier means, a detector producing substantially unidirectional output pulses of duration substantially the same as the duration of said bursts of signals, and means continuously limiting said pulses to a predetermined amplitude, wherein said integrating means comprises an integrating circuit responsive to the limited pulses applying a predetermined level of output voltage to said trigger circuit responsive only to the limited pulses having said predetermined duration, and wherein said trigger circuit means is actuated to fire said flash only upon application of said predetermined level of output voltage thereto by said integrating circuit.

11. Flash-photography apparatus as set forth in claim 10 for use with a camera having a transmitter actuated to emit bursts of induction-field signals of low frequency within a range of up to about 80 kilocycles, wherein said means for intercepting said signals comprises a core of high permeability material and an inductance winding about said core tuned to the low frequency and having signals of said low frequency induced directly therein by the induction-field signals propagated through said surrounding space.

12. Flash-photography apparatus as set forth in claim 11 wherein said predetermined interval is at least about 10 milliseconds, and wherein said integrating circuit includes a resistance and capacitance exhibiting a time constant of at least about 10 milliseconds.

13. Flash-photography apparatus as set forth in claim 11 further comprising a filter tuned to substantially said low frequency and connected intermediate said means for intercepting said signals and said detector to pass to said detector only signals of substantially said frequency, and means shielding said filter from ambient interference and noise signals.

14. Flash-photography apparatus as set forth in claim 11 wherein said flash lamp comprises a gas-filled flash tube for producing a substantially instantaneous flash of illumination upon firing thereof by said trigger circuit, a source of stored unidirectional electrical energy connected across said flash tube for discharge therethrough upon firing of said flash tube, wherein said trigger circuit includes a thyratron tube connected to discharge said source through said flash tube when conducting, means energizing the plate circuit of said thyratron tube with unidirectional voltage, means normally biasing said thyratron tube unidirectionally to a nonconducting state at a predetermined voltage level, said output voltage of said predetermined level applied by said integrating means overcoming the effects of said biasing means to render said thyratron conducting instantly, and wherein said integrating circuit includes a resistance and capacitance having a time constant of at least about 10 milliseconds, said resistance being variable to adjust said time constant.

15. The method of flashing a remote flash lamp synchronously with the actuation of a camera shutter mechanism, which comprises generating and emitting a burst of radio signals at the site of the camera a predetermined time after each actuation of the shutter mechanism and for a predetermined interval of at least several milliseconds until the camera opening is about a maximum, simultaneously intercepting said burst of signals at a remote site and producing a related signal of substantially the same duration as said burst of signals, and firing said flash lamp when said related signal is of duration substantially equal to the time between said predetermined time and the time when said camera opening is about a maximum.

16. The method of flashing a remote flash tube synchronously with the actuation of a camera shutter mechanism which comprises generating a sustained burst of continuous-wave oscillations of frequency within the range of up to about 80 kilocycles and simultaneously propagating said oscillations from the site of the camera as a burst of induction-field signals commencing at a predetermined time after each actuation of the shutter mechanism and continuing for a predetermined interval of at least about 10 milliseconds until the camera opening is about a maximum, simultaneously intercepting said burst of signals at a remote site, detecting and limiting said intercepted signals to produce related signals of predetermined amplitude and of duration substantially equal to the duration of each of the intercepted signals, integrating said detected and limited signals to produce an output voltage of at least a predetermined level when said intercepted signals and detected and limited signals are of duration at least equal to the time between said predetermined time and the time when said camera opening is about a maximum, and firing said flash tube to illuminate a subject to be photographed immediately when said output voltage is of at least said predetermined level.

17. Flash photography apparatus comprising:
(a) a camera having an actuatable shutter mechanism that reaches a particular exposure setting a predetermined time after actuation thereof;
(b) a transmitter actuatable to emit signals;
(c) means to actuate said shutter mechanism, and to actuate said transmitter within said predetermined time following actuation of said shutter mechanism for causing said transmitter to emit sustained signals during a predetermined interval defined by initial actuation of said transmitter and the reaching by said shutter mechanism of said particular exposure setting;
(d) a flash lamp for illuminating a subject to be photographed;
(e) receiver means for receiving said signals and producing a related output signal; and
(f) circuit means for firing said flash lamp at substantially said predetermined time after actuation of said shutter mechanism only in response to output signals which persist for at least said predetermined interval.

18. Apparatus in accordance with claim 17 wherein said receiver means is remote from said transmitter, and transmission of said sustained signals is by way of an induction field.

19. Apparatus in accordance with claim 18 wherein said induction field oscillates at a frequency below 80 kc.

20. Apparatus in accordance with claim 17 wherein said receiver means is remote from said transmitter and transmission of said sustained signals is by way of a C.W. radio signal, said receiver means including detector means for producing a pulse whose duration is the same as the duration of said C.W. signal, and said circuit means including an integrating circuit that integrates said pulse and produces an output which varies with time and reaches a trigger level substantially at the same time said shutter mechanism reaches said particular exposure setting, the output of said integrating circuit when it reaches said trigger level serving to fire said flash lamp.

21. Apparatus in accordance with claim 20 wherein the amplitude of said pulse is proportional to the distance between said transmitter and said receiver means, and said circuit means includes means to limit the pulse to a predetermined amplitude before integration so that the firing of said flash lamp will be synchronized with said shutter mechanism any time actuation of the latter occurs when the receiver means is within a predetermined distance of said transmitter as established by the level at which the pulse is limited.

References Cited by the Examiner
UNITED STATES PATENTS

| | | | |
|---|---|---|---|
| 2,408,764 | 10/46 | Edgerton | 95—11.5 |
| 2,419,978 | 5/47 | Wildman | 95—11.5 |
| 2,764,072 | 9/56 | Walsh | 95—11.5 |

NORTON ANSHER, *Primary Examiner.*

JOHN M. HORAN, *Examiner.*